US008588960B1

(12) United States Patent
Nitulescu (10) Patent No.: US 8,588,960 B1
(45) Date of Patent: Nov. 19, 2013

(54) PICK-AND PLACE PACKAGE MARSHALLING SYSTEM (71) Applicant: Bogdan Nitulescu, Randolph, NJ (US)

(72) Inventor: Bogdan Nitulescu, Randolph, NJ (US)

(73) Assignee: Uhlmann Packaging Systems, L.P., Towaco, NJ (US)

( * ) Notice: Subject to any disclaimer, the term of this patent is extended or adjusted under 35 U.S.C. 154(b) by 0 days.

(21) Appl. No.: 13/753,760

(22) Filed: Jan. 30, 2013

Related U.S. Application Data (60) Provisional application No. 61/663,963, filed on Jun. 25, 2012.

(51) Int. Cl.
G06F 7/00 (2006.01)
(52) U.S. Cl.
USPC .......................................................... 700/218
(58) Field of Classification Search
USPC ......................................... 700/218, 213, 214
See application file for complete search history.

(56) References Cited

U.S. PATENT DOCUMENTS

| 3,760,553 | A | 9/1973 | Schmidt, Sr. et al. |
| 3,948,018 | A | 4/1976 | Rowekamp |
| 5,655,355 | A | 8/1997 | Ramler |
| 5,799,468 | A | 9/1998 | Eck et al. |
| 6,477,442 | B1 * | 11/2002 | Valerino, Sr. ................. 700/213 |
| 6,757,637 | B2 | 6/2004 | Mertens et al. |
| 7,430,841 | B2 | 10/2008 | Seiffert |
| 2005/0246056 | A1 * | 11/2005 | Marks et al. .................. 700/213 |
| 2011/0202171 | A1 | 8/2011 | Rosenbaum |

FOREIGN PATENT DOCUMENTS

WO WO2010024679 A1 3/2010

* cited by examiner

Primary Examiner — Ramya Burgess
(74) Attorney, Agent, or Firm — Thomas J. Germinario (57) ABSTRACT A "pick-and-place" package marshalling system uses multiple pneumatic transfer units synchronized with a packaging conveyor to marshal packets into a single-file array for shipping and to cull out empty and defective packets. The system can be employed in a blister packaging operation in place of a standard marshalling system. A pick-and-place module, comprising one or more pairs of pneumatic transfer units, lifts packets off the conveyor at a pick station, marshalls them into a single-file array, carries the packets above the conveyor to a downstream place station, and pneumatically deposits the packets there.

10 Claims, 11 Drawing Sheets

PICK-AND PLACE PACKAGE MARSHALLING SYSTEM

REFERENCE TO RELATED APPLICATION

This application claims the benefit of the filing date of Provisional Patent Application No. 61/663,963, filed Jun. 25, 2012.

BACKGROUND OF THE INVENTION

The present invention relates to the field of devices and methods for marshalling packaged products, and more particularly to systems for marshalling small packages, such as blister-packaged pharmaceuticals.

Figure 1:
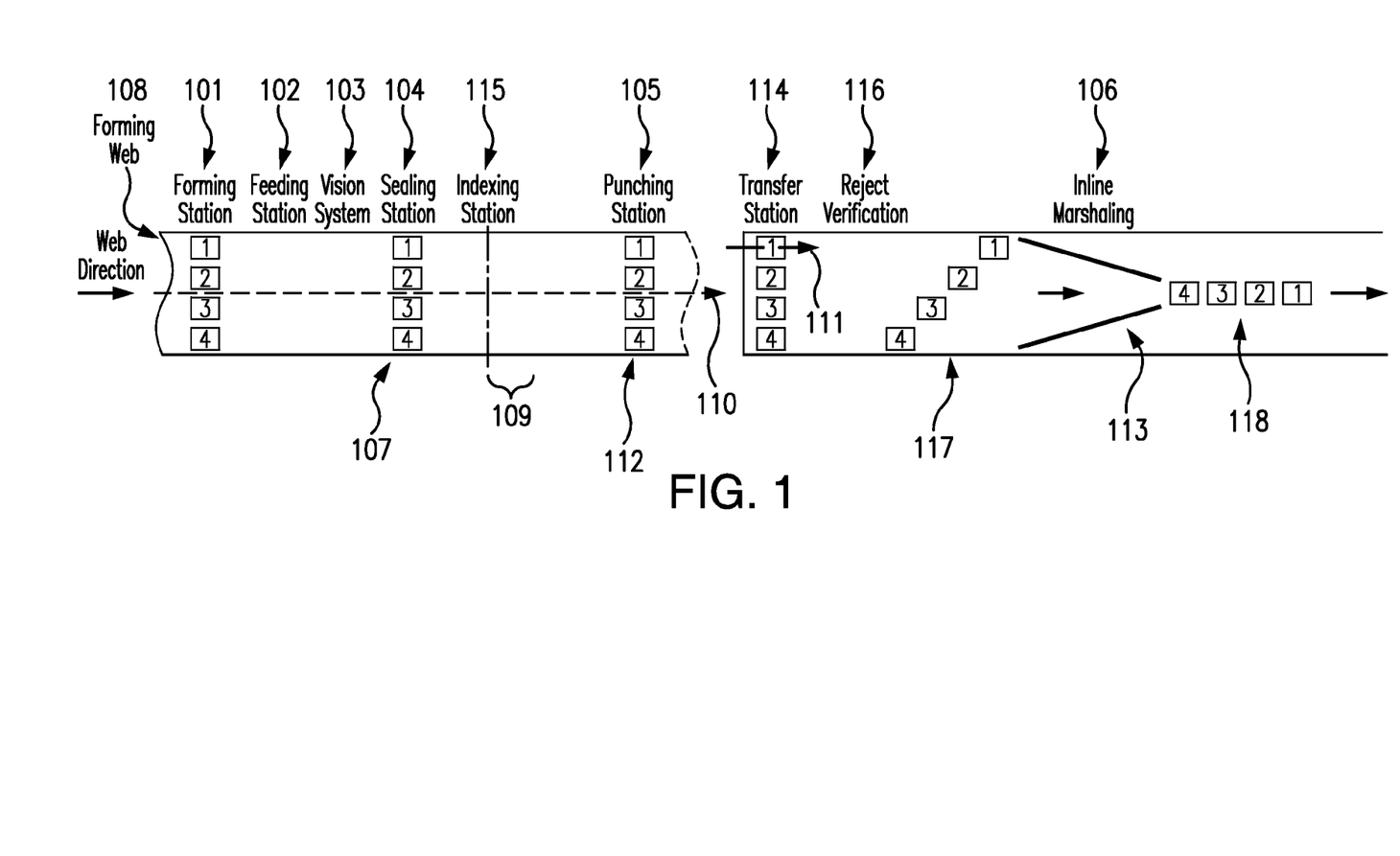
FIG. 1 is a schematic diagram of a standard prior art blister packaging process.

Pharmaceutical tablets and pills are often individually packaged in formed plastic "blisters," which are sealed with a foil backing. In order to expedite the packaging process, blister packets are formed, filled and sealed in multiple laterally-disposed lanes. FIG. 1 is a schematic diagram of a standard blister packaging process, comprising a forming station 101, a feeding station 102, a vision station 103, a sealing station 104, a punching station 105, a transfer station 114 and marshalling station 106.

Blisters are formed out of a continuous web 108 of plastic material at the forming station 101. Blisters are filled with the appropriate quantity of product at the feeding station 102, and the blisters are sealed at the sealing station 104, using a continuous sheet of foil material. The web 108 is controlled by an indexing station 115, which moves stepwise with an established index distance 109. Between the feeding station 102 and the sealing station 104, a vision station 103 determines whether the appropriate quantity of product is present in each packet and whether there is any defective product. At the punching station 105, individual packets 107 are punched out of the continuous formed and sealed web 108. Through the punching station 105 the packets 107 are transferred at the transfer station 114 downstream to the marshalling station 106. The longitudinal centerline of the web 108 establishes the web axis 110. Each of the packets 107 has a longitudinal packet axis 111, which is parallel to the web axis 110.

Individual packets 107 are typically punched out in an in-line array 112 at the punching station 105, as shown in FIG. 1. For convenience, we will refer to them as packets #1, #2, #3 and #4.

At the transfer station 114, defective packets are rejected and only the non-defective packets are transferred in a multi-lane array to the marshalling station 106. The reject verification station 116—comprising an array of photo-sensors connected to the vision station 103 through the machine processor—ensure that all the packets 107 being transferred are in good condition and filled with the right amount of products. If a non-defective packet is rejected or a defective packet is transferred, the reject verification station 116 sends a signal to the processor and the machine automatically stops. In this way, the machine operator can recover the non-defective packet or remove the defective packet from the line.

At the transfer station 114, after defective packets are removed, the in-line array 112 of packets 107 is transferred to a marshaling station 106, where it is rearranged in a pattern amenable to stacking in a shipping container—which is typically a single-file arrangement. In prior art marshalling systems currently in use in the pharmaceutical packaging industry, the multi-lane packet pattern 117 is merged into a single file 118 by converging guide rails 113, as depicted in FIG. 1. This system has the distinct disadvantage, however, that packets—particularly those that are small and lightweight—will often flip over when they contact the guide rail 113 and jam up the marshalling process.

The present invention addresses this problem by providing a "pick & place" marshalling system, which performs the functions of: (a) rejecting empty and defective packets, (b) rearranging the staggered packet array into a single file, and (c) transferring the non-empty, non-defective packets from the indexed conveyor to a single-file marshalling conveyor, which ultimately empties into a shipping container, and (d) making sure that only the non-empty, non-defective packages are transferred and only the empty and defective packages are rejected.

SUMMARY OF THE INVENTION

The "pick-and-place" blister packet marshalling system of the present invention comprises a pick-and-place module operating along a packet conveyor between a pick station and a place station. The pick-and-place module communicates electronically with an upstream packet sensor and central processing unit. The pick-and-place module comprises one or more pairs of pneumatic transfer units, which pneumatically lift the packets off the conveyor at the pick station, marshall the packets into a single-file array, carry the packets downstream above the conveyor to the place station, and pneumatically deposit the packets in the single-file array at the place station. From the place station, the packets are carried by a single-file marshalling conveyor to a shipping container.

The timing of the system's operations at the pick station and the place station is synchronized with the motion of the conveyor by the central processing unit. The packet sensor identifies packets that are either empty or filled with defective product. The sensor signals the pneumatic transfer units to bypass the empty packets, so that the conveyor carries them into a first reject receptacle, and to deposit the defective parcels in a second reject receptacle. Alternately, the sensor can signal the module to bypass the defective parcels to the first reject receptacle and deposit the empty parcels in the second reject receptacle.

The marshalling of the packets into a single-file array is performed by the pick-and-place module by differentially displacing the packets to that they align with the central longitudinal conveyor axis. Pairs of distal packets, which are farther removed from the conveyor axis, are given a greater displacement by the pneumatic transfer units, while pairs of proximal packets, which are closer to the conveyor axis, are given a lesser displacement.

The foregoing summarizes the general design features of the present invention. In the following sections, a specific embodiment of the present invention will be described in some detail. This specific embodiment is intended to demonstrate the feasibility of implementing the present invention in accordance with the general design features discussed above. Therefore, the detailed description of this embodiment is offered for illustrative and exemplary purposes only, and it is not intended to limit the scope either of the foregoing summary description or of the claims which follow.

DETAILED DESCRIPTION OF THE PREFERRED EMBODIMENT

Figure 2A:
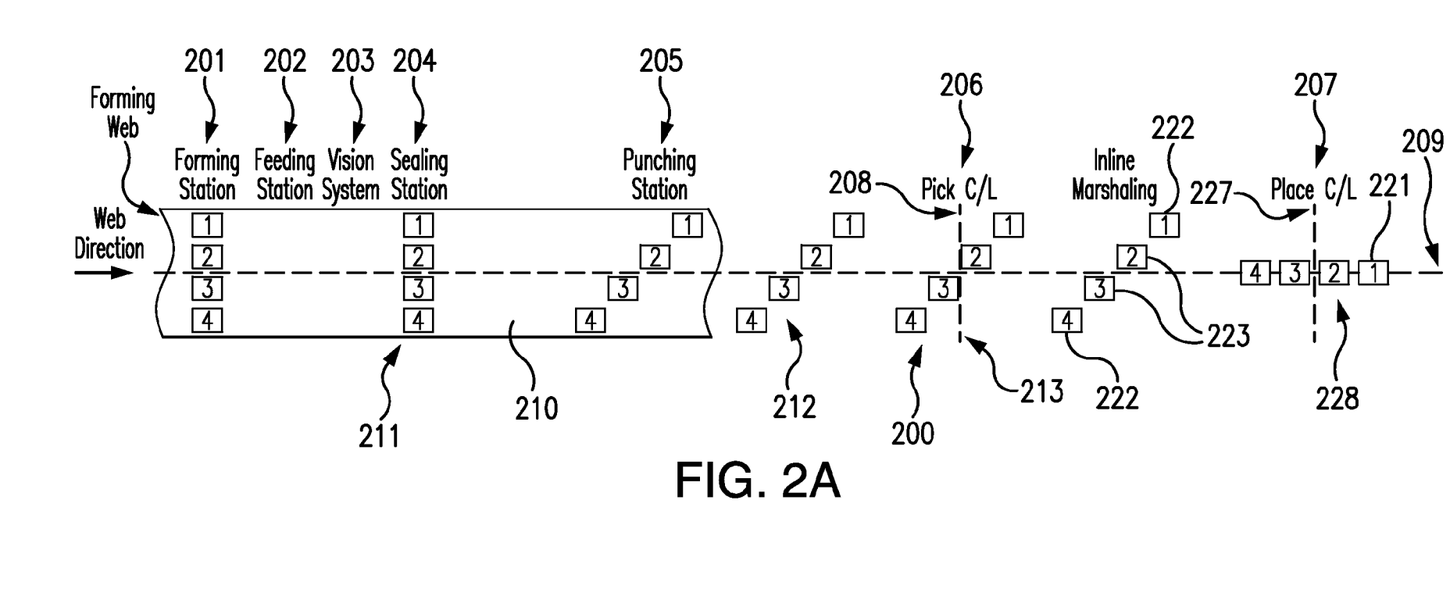
FIG. 2A is a schematic diagram of the blister packaging process of the present invention.

As shown schematically in FIG. 2A, the pick-and-place marshalling system of the present invention performs downstream of a forming station 201, a feeding station 202, a vision station 203, a sealing station 204 and a punching station 205, similar to the standard prior art transferring and marshalling system depicted in FIG. 1. In the present invention, however, the standard transfer (FIG. 1, 114), reject verification (FIG. 1, 116) and marshalling stations (FIG. 1, 106) are replaced by a compact pick-and-place module 200 capable of rejecting, controlling, marshalling and transferring all together. The pick-and-place module 200 comprises multiple pneumatic transfer units 270, and it operates between a pick station 206 and a place station 207. The pick station 206 has a pick centerline 208, which aligns perpendicular to the longitudinal axis 209 of the conveyor 210. Contrary to the prior art, the individual packets 211 emerge from the punching station 205 in a multi-lane staggered array 212. The staggered array 212 has a transverse array midpoint 213 that is parallel to the pick centerline 208. In the example depicted in FIG. 2A, the array midpoint 213 is located between packet #2 and packet #3 and makes a right angle with the conveyor axis 209.

Figure 2B:
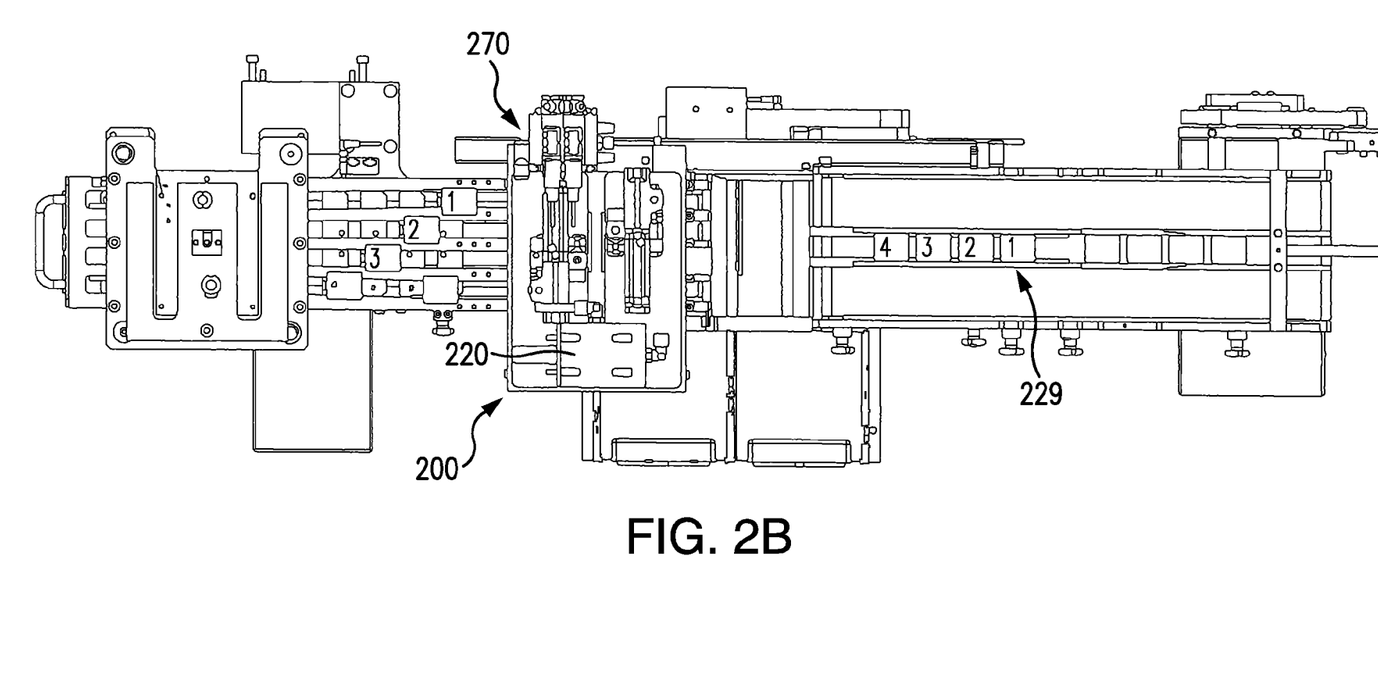
FIG. 2B is a top plan view of the blister packaging process of the present invention.
Figure 2C:
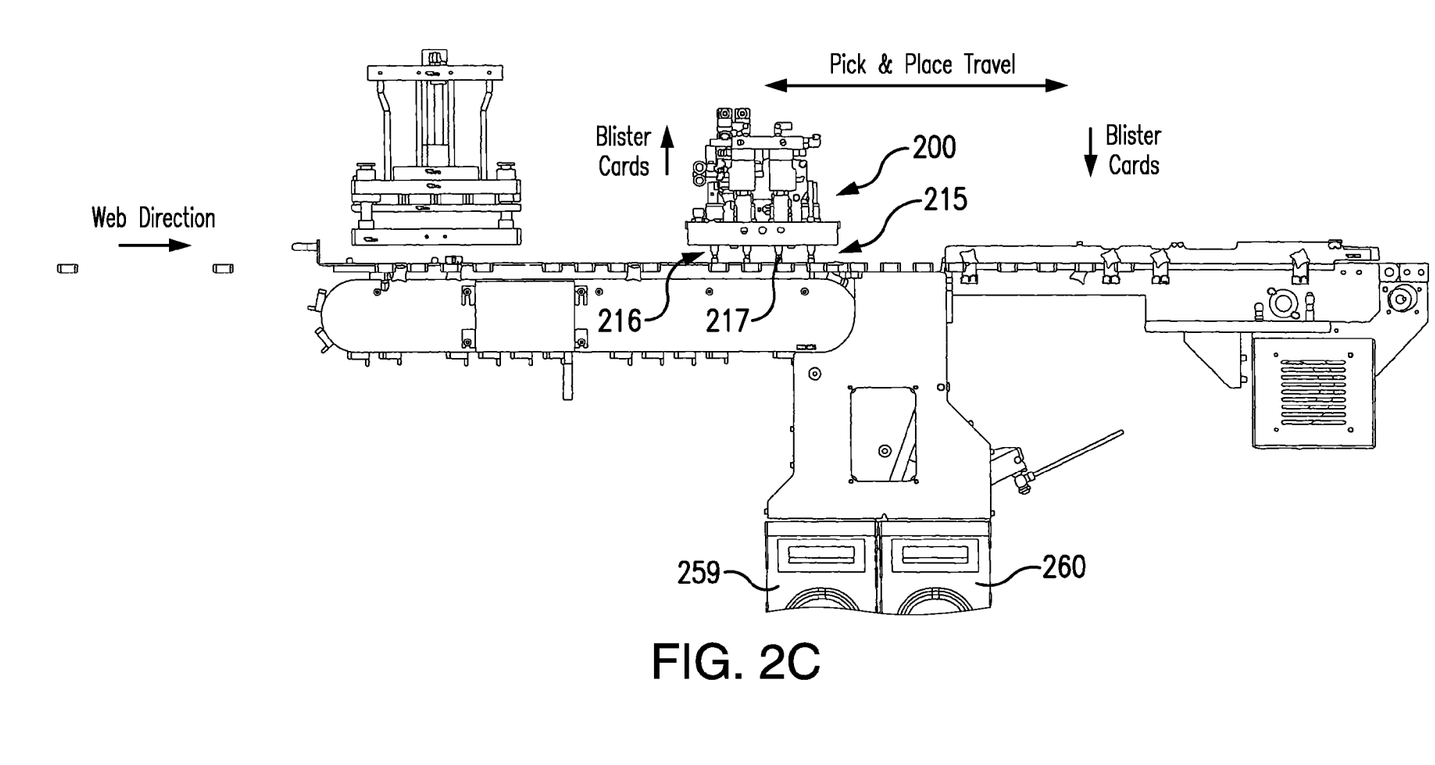
FIG. 2C is side profile view of the blister packaging process of the present invention.

The continuous or indexed stepwise movement of the conveyor 210 and the pick-and-place module 200 are synchronized: when the array midpoint 213 coincides with the pick centerline 208, a programmable system processor activates a plurality of pneumatic transfer units 270, as depicted in FIG. 2B. The pneumatic transfer units 270 contain multiple vacuum cylinders 215, as shown in FIG. 2C, which engage each of the packets 211 that have not been detected as empty by the upstream vision system 203.

Figure 3A:
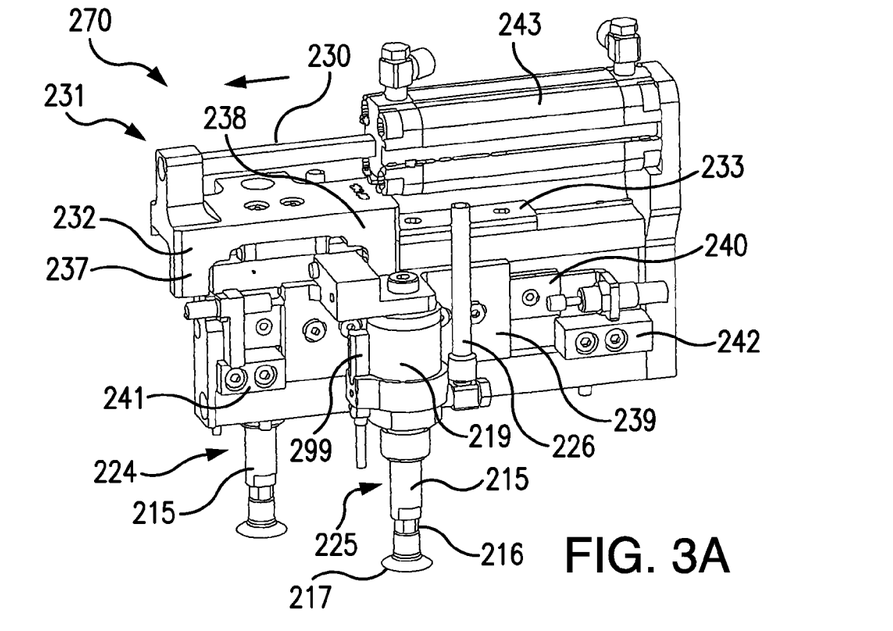
FIG. 3A is a perspective view of a pneumatic transfer unit of the preferred embodiment of the present invention in the "pick" position.
Figure 3B:
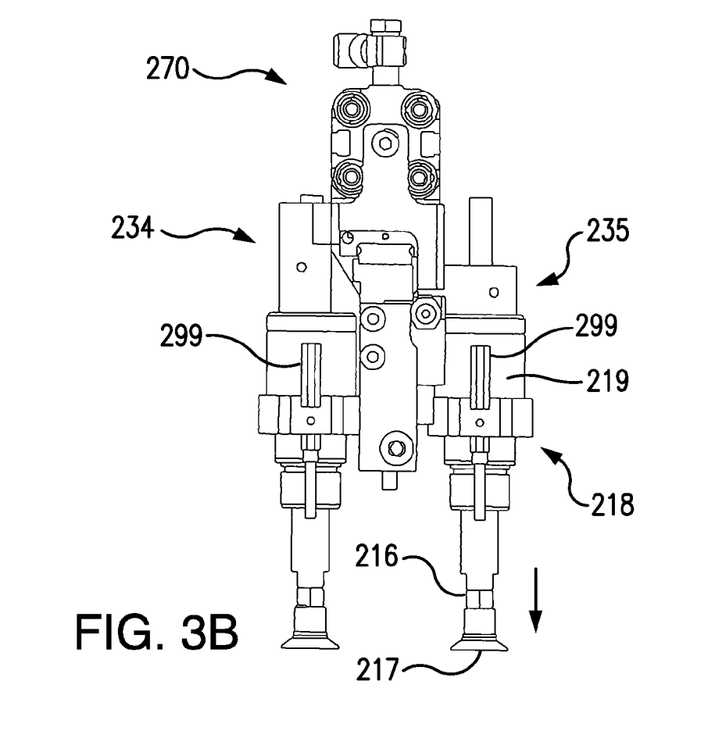
FIG. 3B is a front profile view of a pneumatic transfer unit of the preferred embodiment of the present invention in the "pick" position.
Figure 3C:
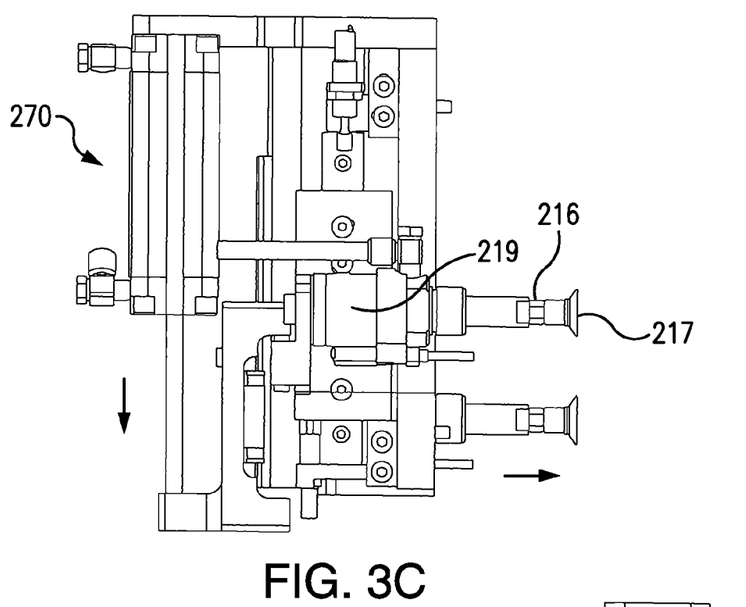
FIG. 3C is a side profile view of a pneumatic transfer unit of the preferred embodiment of the present invention in the "pick" position.
Figure 5A:
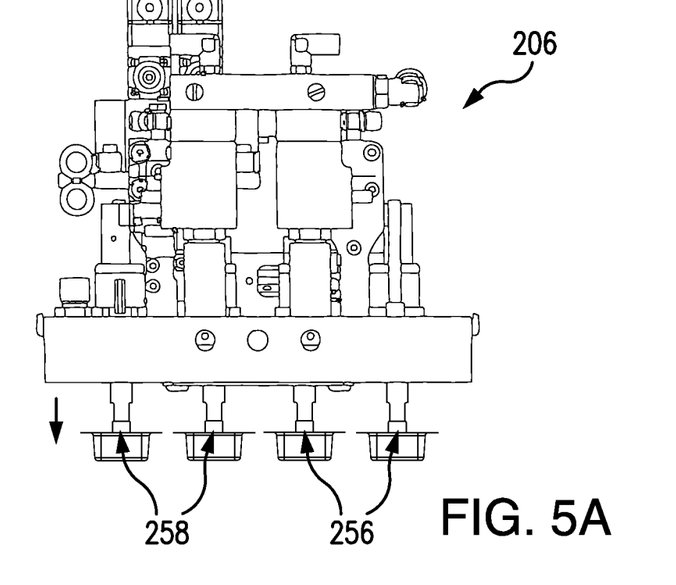
FIG. 5A is a side profile view of a pick-and-place module of the preferred embodiment of the present invention in the "pick" position.
Figure 5B:
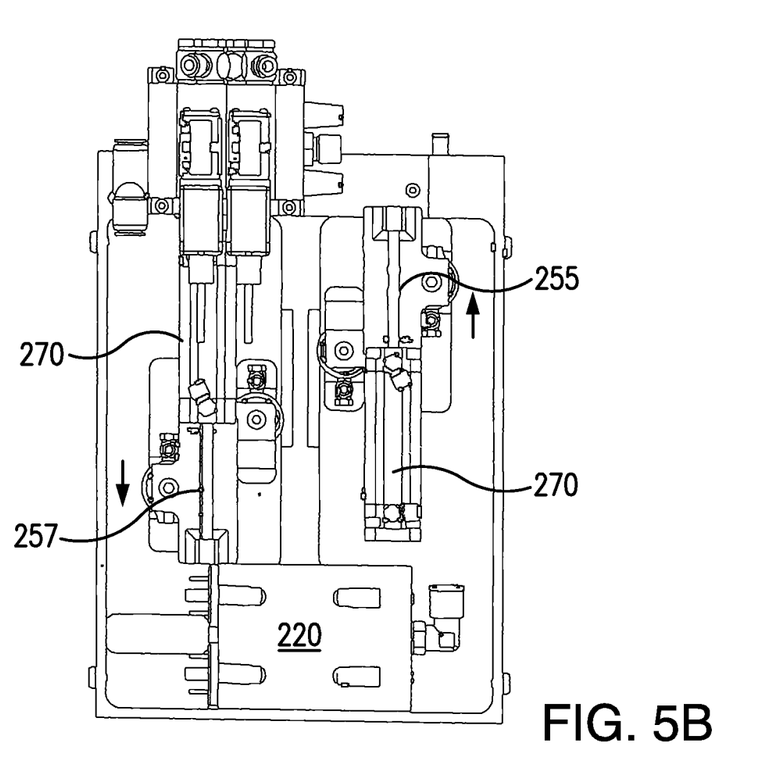
FIG. 5B is a top plan view of a pick-and-place module of the preferred embodiment of the present invention in the "pick" position.
Figure 5C:
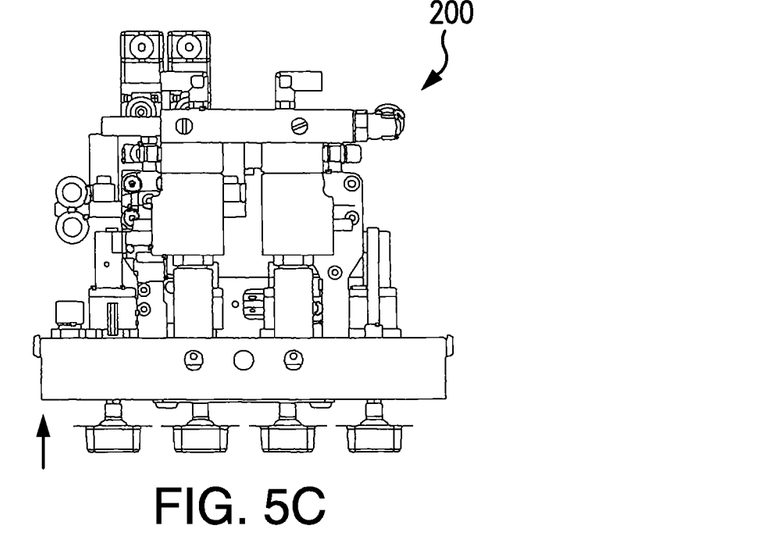
FIG. 5C is a side profile view of a pick-and-place module of the preferred embodiment of the present invention in the inline marshalling position.
Figure 5D:
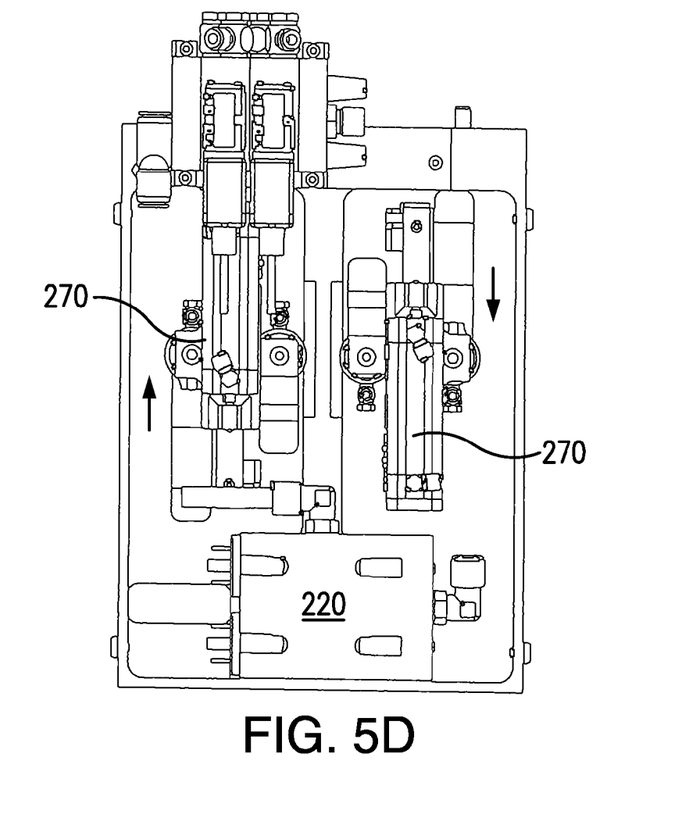
FIG. 5D is a top plan view of a pick-and-place module of the preferred embodiment of the present invention in the inline marshalling position.
Figure 5E:
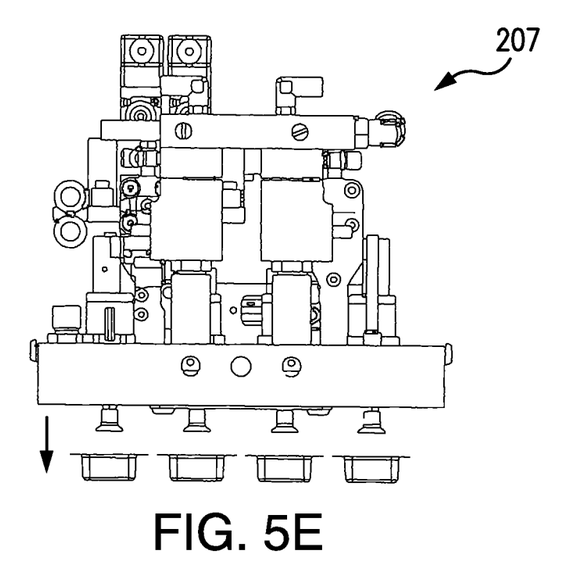
FIG. 5E is a side profile view of a pick-and-place module of the preferred embodiment of the present invention in the "place" position.

As depicted in FIGS. 3A-C and 4A-C, each of the vacuum cylinders 215 has a telescoping distal end 216 terminating in a suction cup 217. The proximal end 218 of each vacuum cylinder 215 comprises a plenum 219, into which either pressurized air or a partial vacuum is introduced through an air hose 226 by the action of a solenoid valve 220 (see FIGS. 5B, D and F). As shown in FIGS. 3A-B, at the pick station 206, each of the activated vacuum cylinders 215 is in the vacuum mode, such that, upon its suction cup 217 engaging a packet 211, negative vacuum pressure causes the telescoping distal end 216 to retract upward, thereby lifting the packet 211 up off the conveyor 210.

Figure 3D:
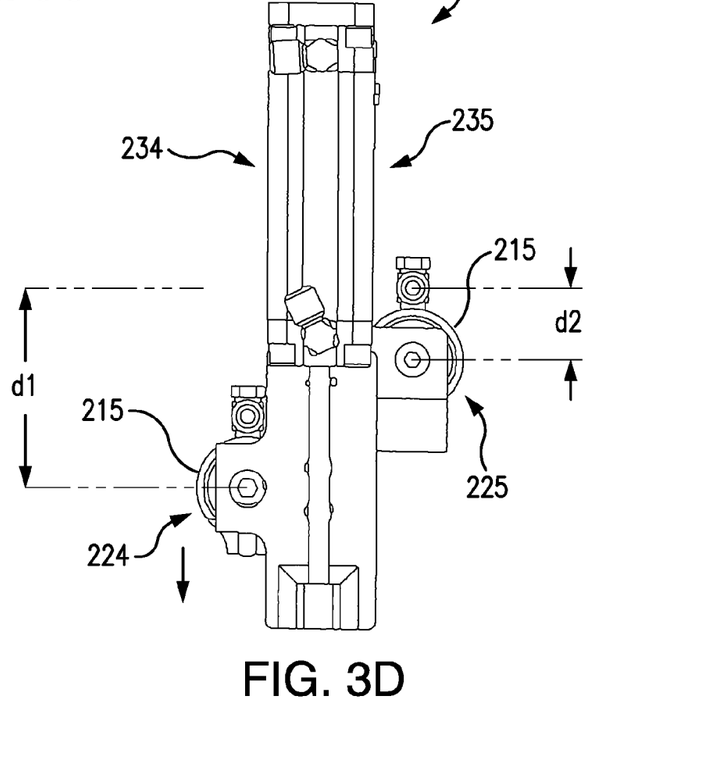
FIG. 3D is a top plan view of a pneumatic transfer unit of the preferred embodiment of the present invention in the "pick" position.
Figure 4A:
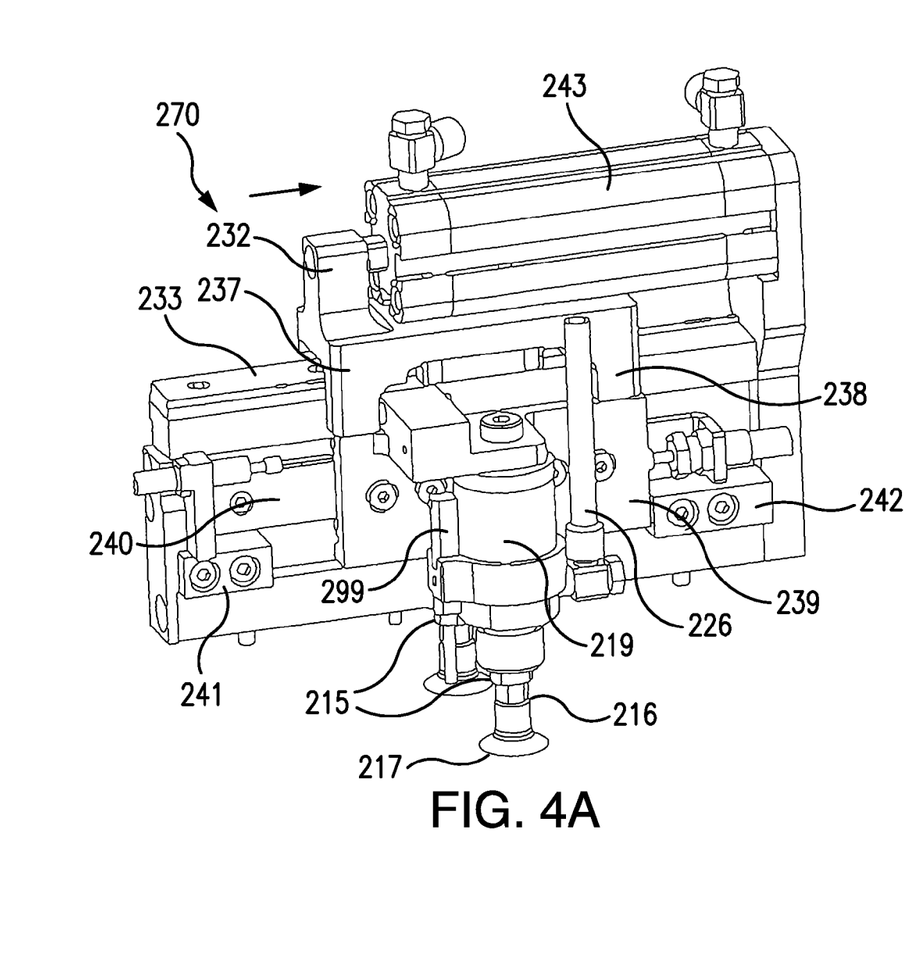
FIG. 4A is a perspective view of a pneumatic transfer unit of the preferred embodiment of the present invention in the "place" position.
Figure 4B:
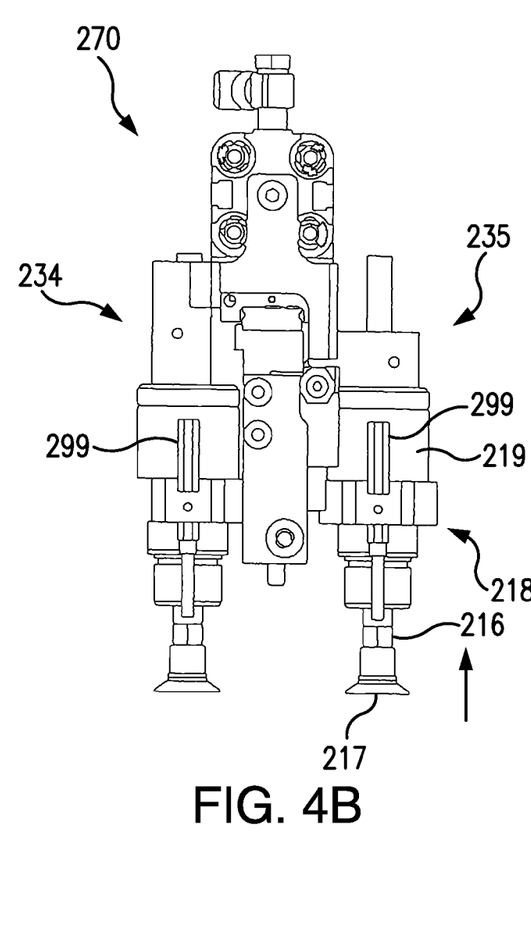
FIG. 4B is a front profile view of a pneumatic transfer unit of the preferred embodiment of the present invention in the "place" position.
Figure 4C:
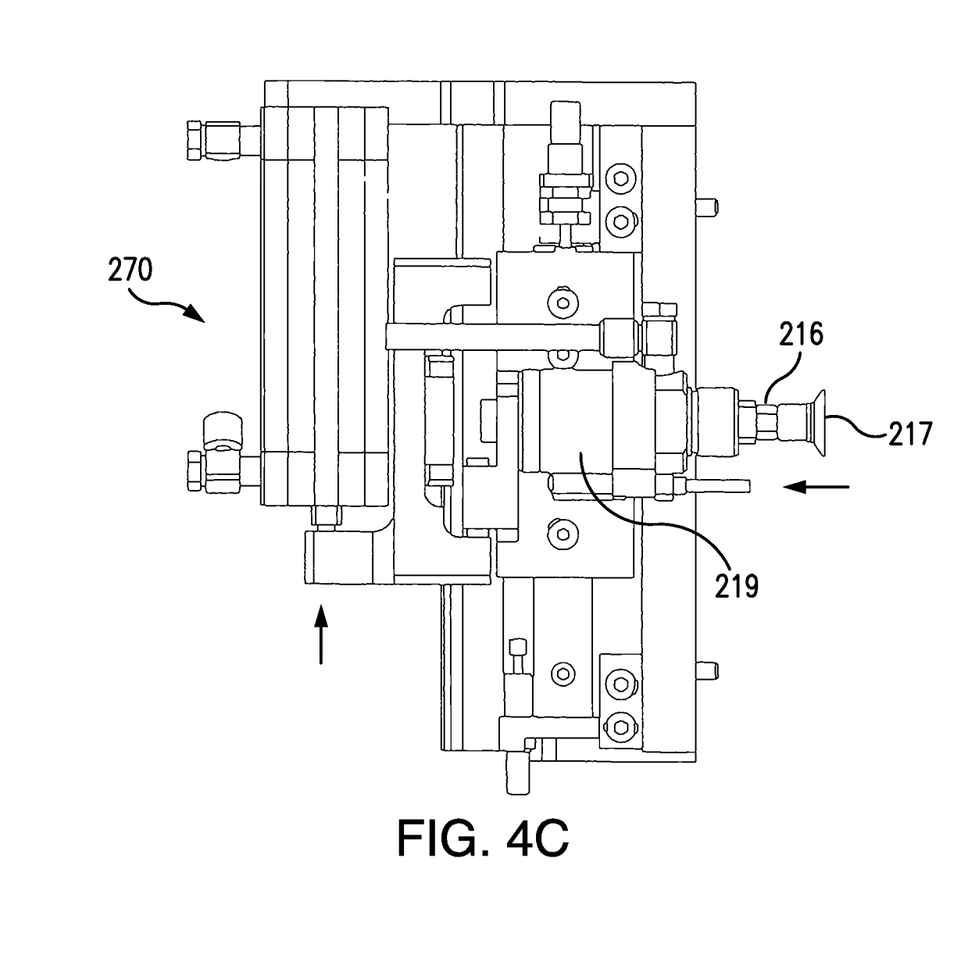
FIG. 4C is a side profile view of a pneumatic transfer unit of the preferred embodiment of the present invention in the "place" position.
Figure 4D:
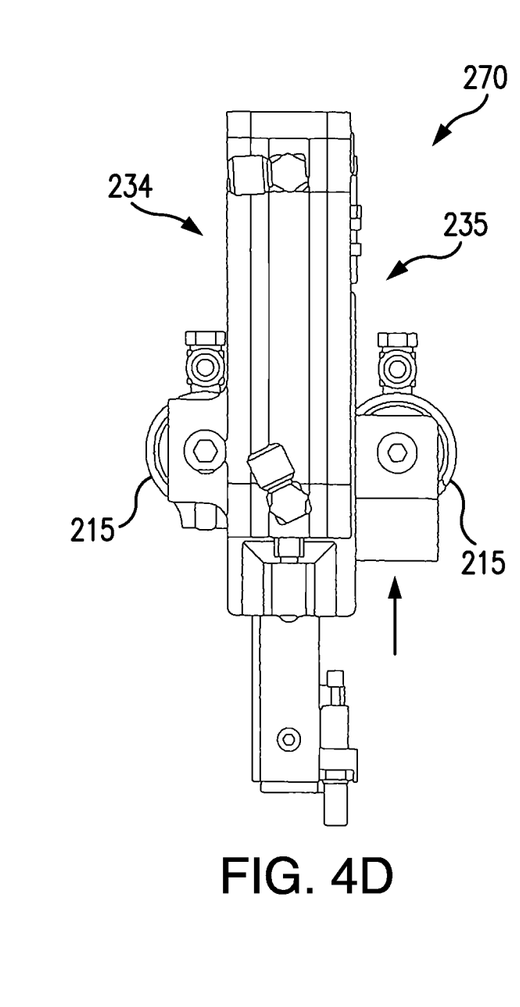
FIG. 4D is a top plan view of a pneumatic transfer unit of the preferred embodiment of the present invention in the "place" position.

Once lifted from the conveyor 210 at the pick center line 208, each of the packets 211 is displaced by the pneumatic transfer units 270 so that its longitudinal packet axis 221 aligns with the longitudinal conveyor axis 209. As depicted in FIG. 2A, the centripetal displacement of the packets 211 is symmetrical about the conveyor axis 209. The distal packets 222, i.e., those in the lanes furthest from the conveyor axis 209—in this example packet #1 and packet #4—are given a greater displacement $d_1$. The proximal packets 223, i.e., those in the lanes closest to the conveyor axis 209—in this example packet #2 and packet #3—are given a lesser displacement $d_2$. As shown in FIG. 3D, the vacuum cylinders 215 that engage and lift the distal packets 222 are designated as distal vacuum cylinders 224, while those that engage and lift proximal packets 223 are proximal vacuum cylinders 225.

This differential centripetal displacement is accomplished by a series of paired, oppositely disposed pneumatically driven pusher rods 230 in the pneumatic transfer unit 270, as depicted in FIGS. 3A-D and 4A-D. The distal end 231 of each pusher rod 230 is attached to a pusher bar 232, which slides along an upper guide rail 233. The pusher bar 232 has an outer side 234 and an inner side 235. The outer side 234 of the pusher bar 232 is directly connected to one of the distal vacuum cylinders 224, while the inner side 235 comprises two pusher flanges 236, a rear pusher flange 237 and a forward pusher flange 238, which alternately engage a slide block 239 attached to one of the proximal vacuum cylinders 225. The slide block 239 slides along a lower guide rail 240, between a forward stop 241 and a rear stop 242.

Figure 5F:
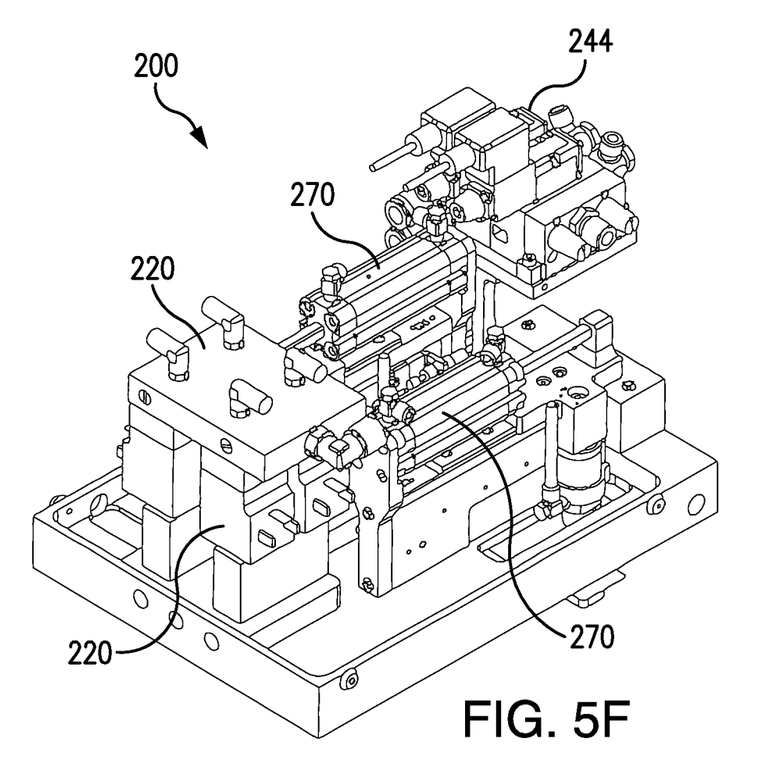
FIG. 5F is a perspective view of a pick-and-place module of the preferred embodiment of the present invention in the "place" position.

The extension of each pusher rod 230 is controlled by a pneumatic cylinder 243, to which compressed air is applied by a secondary solenoid valve 244 (see FIG. 5F). In the "pick" position 206, as depicted in FIGS. 3A-D, the pneumatic cylinder 243 is pressurized, the pusher rod 230 is fully extended, and it pushes the pusher bar 232 to the distal end of the upper guide rail 233. In this extended position, the distal vacuum cylinder 224 connected to the outer side 234 of the pusher bar 232 is at the greater displacement $d_1$ from the conveyor axis 209. In this extended position, the forward pusher flange 238 on the inner side 235 of the pusher bar 232 engages the slide block 239 to which the proximal vacuum cylinder 225 is attached and forces it against the forward stop 241. At this point, the proximal vacuum cylinder 225 is at the lesser displacement $d_2$ from the conveyor axis 209.

In the "place" position, as depicted in FIGS. 4A-D, compressed air is applied to the pneumatic cylinder 243 by the secondary solenoid valve 244, the pusher rod 230 is fully refracted, and it pulls the pusher bar 232 to the proximal end of the upper guide rail 233. In this refracted position, the distal vacuum cylinder 224 on the outer side 234 of the pusher bar 232 is moved into alignment with the conveyor axis 209. Simultaneously, the rear pusher flange 237 on the inner side 235 of the pusher bar 232 engages the slide block 239 to which the proximal vacuum cylinder 225 is attached on the inner side 235 of the pusher bar 232 and forces it against the rear stop 242, which it is aligned with the conveyor axis 209.

As shown in FIGS. 5A-F, each pick-and-place module 200 comprises a pair of opposing pneumatic transfer units 270 with opposing pneumatic cylinders 243 having cooperating oppositely-disposed pusher rods 230. A first pusher rod 255 controls the centripetal displacement of the leading vacuum cylinders 256, which lift packets #1 and #2 in this example. A second pusher rod 257 controls the oppositely-directed centripetal displacement of the trailing vacuum cylinders 258, which in this example lift packets #3 and #4.

Referring to FIG. 2A-C, once marshalling of the packets 211 in line with the conveyor axis 209 is completed, the pick-and-place module 200 as a whole, with the lifted packets 211 attached to the vacuum cylinders 215, shifts upstream from the pick centerline 208, transferring the packets/blisters to the place centerline 227. The inline packet array 228 is positioned with its midpoint aligned with the place centerline 227, and the telescoping distal ends 216 of the vacuum cylinders 215 are lowered. The primary solenoid valves 220 switch the feed to the vacuum cylinder air hoses 226 from vacuum to compressed air, thereby causing the lifted packets 211 to be released from the suction cups 217 of the vacuum cylinders 215 and placed onto the marshalling conveyor 229.

As for the non-filled/empty packets which are identified by the vision system 203, since these are not picked up from the indexed conveyor 210, they continue to travel to the end of the conveyor 210 and fall into a designated empty packet receptacle 259. The defective and/or improperly filled packets containing product are considered medical waste, therefore they cannot be mixed with empty packets/blisters. The defective and/or improperly filled packets are lifted by the pneumatic transfer units 270 at the pick center line 208, and rejected upstream into a designated reject packet receptacle 260 upstream of the place centerline 227.

The reject verification, contrary to the prior art, is also included in the pick-and-place module 200. As shown in FIGS. 3A-B and 4A-B, each vacuum cylinder 215 has a reject control sensor 299, attached to it. This sensor 299 detects if a defective or empty packet was transferred and/or a non-defective packet was rejected, and if so, it automatically stops the machine.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A system for marshalling multiple packets on a conveyor, comprising:
   a pick-and-place module, comprising one or more pairs of pneumatic transfer units, which pneumatically lift the packets off the conveyor at a pick station, marshal the packets into a single-file array, carry the marshalled packets downstream above the conveyor to a place station, and pneumatically deposit the packets in the single-file array at the place station.

2. The system according to claim 1, further comprising a programmable central processing unit, which synchronizes actions of the pick-and-place module and the pneumatic transfer units with continuous or indexed stepwise movement(s) of the conveyor.

3. The system according to claim 2, further comprising a packet sensor upstream of the pick station and in electronic communication with the pick-and-place module and the central processing unit, wherein the packet sensor detects and identifies empty packets, which are not filled with product(s), and defective packets, which are filled with defective product(s).

4. The system according to claim 3, wherein the packet sensor signals the pick-and-place module, directly or through the central processing unit, to have the pneumatic transfer units bypass the empty packets, so that the empty packets travel to the end of the conveyor and drop into a first reject receptacle, and wherein the packet sensor signals the pick-and-place module to have the pneumatic transfer units deposit the defective parcels in a second reject receptacle.

5. The system according to claim 3, wherein the packet sensor signals the pick-and-place module, directly or through the central processing unit, to have the pneumatic transfer units bypass the defective packets, so that the defective packets travel to the end of the conveyor and drop into a first reject receptacle, and wherein the packet sensor signals the pick-and-place module to have the pneumatic transfer units deposit the empty parcels in a second reject receptacle.

6. The system according to claim 1, wherein the pneumatic transfer units marshal the packets into a single-file array by differentially centripetally displacing each packet with respect to a central longitudinal axis of the conveyor, so that each packet aligns with the central longitudinal axis of the conveyor, and such that distal packets, which are farthest from the central longitudinal axis of the conveyor, are given a greater centripetal displacement than proximal packets, which are closest to the central longitudinal axis of the conveyor.

7. The system according to claim 2, wherein the pneumatic transfer units marshal the packets into a single-file array by differentially centripetally displacing each packet with respect to a central longitudinal axis of the conveyor, so that each packet aligns with the central longitudinal axis of the conveyor, and such that distal packets, which are farthest from the central longitudinal axis of the conveyor, are given a greater centripetal displacement than proximal packets, which are closest to the central longitudinal axis of the conveyor.

8. The system according to claim 3, wherein the pneumatic transfer units marshal the packets into a single-file array by differentially centripetally displacing each packet with respect to a central longitudinal axis of the conveyor, so that each packet aligns with the central longitudinal axis of the conveyor, and such that distal packets, which are farthest from the central longitudinal axis of the conveyor, are given a greater centripetal displacement than proximal packets, which are closest to the central longitudinal axis of the conveyor.

9. The system according to claim 4, wherein the pneumatic transfer units marshal the packets into a single-file array by differentially centripetally displacing each packet with respect to a central longitudinal axis of the conveyor, so that each packet aligns with the central longitudinal axis of the conveyor, and such that distal packets, which are farthest from the central longitudinal axis of the conveyor, are given a greater centripetal displacement than proximal packets, which are closest to the central longitudinal axis of the conveyor.

10. The system according to claim 5, wherein the pneumatic transfer units marshal the packets into a single-file array by differentially centripetally displacing each packet with respect to a central longitudinal axis of the conveyor, so that each packet aligns with the central longitudinal axis of the conveyor, and such that distal packets, which are farthest from the central longitudinal axis of the conveyor, are given a greater centripetal displacement than proximal packets, which are closest to the central longitudinal axis of the conveyor.

* * * * *